United States Patent
Surek et al.

(10) Patent No.: US 8,582,607 B2
(45) Date of Patent: *Nov. 12, 2013

(54) GEOGRAPHICALLY-DIVERSE REDUNDANT SERVERS OVER OPTICAL CONNECTIONS WITH MANAGED PATH DIFFERENTIAL DELAY

(75) Inventors: Steven A. Surek, Leonardo, NJ (US); Eddie Fung, Englishtown, NJ (US)

(73) Assignee: Ciena Corporation, Hanover, MD (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/965,093

(22) Filed: Dec. 10, 2010

(65) Prior Publication Data
US 2011/0076031 A1    Mar. 31, 2011

Related U.S. Application Data (63) Continuation-in-part of application No. 11/599,662, filed on Nov. 15, 2006, now Pat. No. 7,864,817.

(60) Provisional application No. 60/760,263, filed on Jan. 19, 2006.

(51) Int. Cl.
*H04J 3/06* (2006.01)
*G06F 15/16* (2006.01)

(52) U.S. Cl.
USPC ............................. 370/518; 709/203; 370/350

(58) Field of Classification Search
USPC .............. 370/519, 503, 395.1, 412, 517, 518, 370/350; 709/203
See application file for complete search history.

(56) References Cited

U.S. PATENT DOCUMENTS

| | | | |
|---|---|---|---|
| 6,324,586 B1 | 11/2001 | Johnson | |
| 7,254,402 B2 | 8/2007 | Vayanos et al. | |
| 7,412,371 B2 * | 8/2008 | Fisher et al. | 703/17 |
| 7,415,048 B2 * | 8/2008 | Wu | 370/542 |
| 7,535,931 B1 | 5/2009 | Zampetti et al. | |
| 7,864,817 B2 * | 1/2011 | Surek et al. | 370/519 |
| 8,018,926 B2 * | 9/2011 | Ling et al. | 370/379 |
| 2009/0067844 A1 | 3/2009 | Archambault et al. | |

OTHER PUBLICATIONS

Bill White, Rav Meerwald, Jeff Nesbitt; "zSeries Qualified WDM Vendor: Cisco Systems", 20 pages, Redbooks Paper; Copyright IBM Corp. 2005.

(Continued)

*Primary Examiner* — Hanh N Nguyen
(74) *Attorney, Agent, or Firm* — Clements Bernard PLLC; Christopher L. Bernard; Lawrence A. Baratta, Jr.

(57) ABSTRACT

The present disclosure relates to systems and methods for geographically-diverse redundant servers and the like interconnected via wavelength division multiplexed (WDM) systems with managed path differential delay of the WDM systems. The present disclosure provides transport systems and methods incorporating absolute time references, such as global positioning system (GPS) time references and/or the like, and selective buildout delays, such as first-in, first-out (FIFO) buildout delays and/or the like. In one exemplary embodiment, the transport systems and methods of the present invention are used in conjunction with the International Business Machine Corporation (IBM) Geographically-Dispersed Parallel Sysplex (GDPS) integrated, automated application and data availability solution to meet and/or exceed the associated 10 microseconds transmit/receive path differential delay requirement. Other comparable uses are also contemplated herein, as will be obvious to those of ordinary skill in the art.

13 Claims, 6 Drawing Sheets

(56) References Cited

OTHER PUBLICATIONS

Bill White, Rav Meerwald, Jeff Nesbitt; "zSeries Qualified WDM Vendor: Nortel Networks", 17 pages, Redbooks Paper; Copyright IBM Corp. 2005.

Pierre Cassier, Axel Ligny, David Raften; "GDPS/PPRC 100Km Distance Testing", 47 pages, IBM System z, May 2006.
Frank Kyne, Noshir Dhondy, David Raften, Mark Ratte; "GDPS Family—An Introduction to Concepts and Capabilities", 153 pages, ibm.com/redbooks, Redbooks, Dec. 2005.

* cited by examiner

GEOGRAPHICALLY-DIVERSE REDUNDANT SERVERS OVER OPTICAL CONNECTIONS WITH MANAGED PATH DIFFERENTIAL DELAY

CROSS-REFERENCE TO RELATED APPLICATION(S)

This present non-provisional patent application is a continuation-in-part of U.S. patent application Ser. No. 11/599,662 filed Nov. 15, 2006 now U.S. Pat. No. 7,864,817, and entitled "TRANSPORT SYSTEMS AND METHODS INCORPORATING ABSOLUTE TIME REFERENCES AND SELECTIVE BUILDOUT DELAYS," which claims priority to U.S. Provisional Patent Application Ser. No. 60/760,263 filed Jan. 19, 2006, and entitled "TRANSPORT SYSTEMS AND METHODS INCORPORATING ABSOLUTE TIME REFERENCES AND SELECTIVE BUILD-OUT DELAYS", each of which is incorporated in-full by reference herein.

FIELD OF THE INVENTION

The present invention relates generally to the telecommunications, data storage, and optical networking fields. More specifically, the present invention relates to systems and methods for geographically-diverse redundant servers and the like interconnected via wavelength division multiplexed (WDM) systems with managed path differential delay of the WDM systems.

BACKGROUND OF THE INVENTION

According to IBM, "Geographically-Dispersed Parallel Sysplex (GDPS) is an integrated, automated application and data availability solution designed to provide the capability to manage . . . remote copy configuration and storage subsystem(s), automate Parallel Sysplex operational tasks, and perform failure recovery from a single point of control, thereby helping to improve application availability." ("GDPS: The e-business Availability Solution," Noshir Dhondy, et al., IBM Executive Summary, March 2005). GDPS supports both synchronous and asynchronous forms of remote copy.

GDPS is a disaster recovery manager for IBM computers. GDPS monitors all the Logical Partitions (LPARs) in the Sysplex, both operating systems (OSS) and Coupling Facilities, it also monitors the Direct access storage device (DASD) whether Peer to Peer Remote Copy (PPRC) or Extended Remote Copy (XRC) is being used to mirror the data. A Systems Complex, commonly called a Sysplex, is one or more IBM System/390 processors joined into a single unit. Put another way, a Sysplex is an instance of a computer system running on one or more physical computers. Sysplexes are often isolated to a single system, but Parallel Sysplex technology allows multiple mainframes to act as one. Sysplexes can be broken down into LPARs each running a different operating system. Components of a Sysplex include: a Sysplex Timer which synchronizes all member systems' clocks; Global Resource Serialization (GRS), which allows multiple systems to access the same resources concurrently, serializing where necessary to ensure exclusive access; and Cross System Coupling Facility (XCF), which allows systems to communicate peer to peer.

GDPS may be used in, for example, geographically-redundant server applications, especially those involving transaction processing, etc. A typical application includes geographically diverse data centers. In such server applications, it is crucial that both primary and backup servers reflect real time information, especially in synchronous mode. In other words, transactions may be time stamped, and these time stamps must be consistent between primary and backup servers, for a variety of application-specific reasons. The geographically diverse servers are typically connected together through optical fiber, and the sites can be diverse up to 200 km distance. Of particular importance is the time information between the primary and backup servers between the geographically diverse locations. The primary and backup servers include a timer, such as the Sysplex Timer with regards to GDPS, and the timer is configured to synchronize the clocks on both servers to ensure consistency. In regards to geographically diverse locations, a timing reference must be used to provide synchronization.

Previously with regards to GDPS, an external time reference (ETR) link was used (i.e. a clock distributor/timer box was associated with each server complex) to sync primary and backup servers. Sync accuracy, however, was limited. For example, the IBM 9037 Sysplex Timer is a mandatory component of GDPS/PPRC. The Sysplex Timer provides an ETR to synchronize the time of day (TOD) clocks on attached servers in a GDPS/PPRC environment. The 9037 Sysplex Timer uses two link types: an ETR and a Control Link Oscillator (CLO). ETR links are connections between the Sysplex Timer and the server ETR ports providing clock synchronization between multiple servers. CLO links are connections between two Sysplex Timer units in High Availability mode allowing synchronization of the Sysplex Timer timing signals.

To ensure correct Sysplex Timer and server time synchronization, the end-to-end lengths of the transmit and receive fibers within an individual ETR or CLO link must be equal (within 10 meters). However, special care should be taken when using erbium-doped fiber amplifiers (EDFAs) or dispersion compensation units (DCUs) to ensure the end-to-end lengths of the transmit and receive fibers of the link are equal (within 10 meters). EDFAs and DCUs contain significant lengths of fiber, which must be included in the total fiber distance calculation. Furthermore, the lengths of fiber may be asymmetric between the transmit and receive fibers. For long distances over fiber, these requirements are challenging and result in low accuracy.

More recently, IBM has integrated time synchronization functions previously provided via the ETR links, which operate at a data rate of 8 Mbps, into the intersystem channel (ISC) link which operates at 2.125 Gbps and provides other control functions beyond those provided by ETR links. These ISC links execute a proprietary server time protocol (STP) which is similar to the network time protocol (NTP). STP-capable ISC links are expected to replace ETR links over time. Advantageously, such an ISC link is faster and more accurate than the ETR link. However, ISC links are limited in distance below 100 km.

Despite these advances, the determination of transmit/receive path differential delay is still lacking in conventional systems and methods. This determination is very important because IBM specifies less than a 10 microsecond transmit/receive path differential delay requirement. This 10 microsecond transmit/receive path differential delay requirement is apportioned as follows: 5 microseconds for the fiber plant (including any required optical amplifiers and their associated dispersion compensating fiber), 2.5 microseconds for the electronic equipment at either end of the connection, and 2.5 microseconds for margin.

Figure 1:
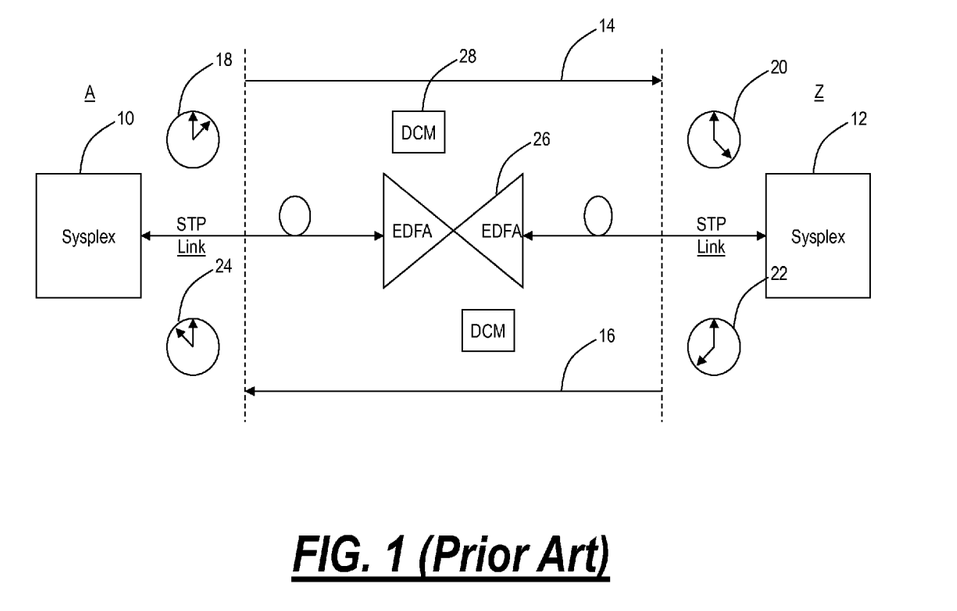
FIG. 1 is a schematic diagram illustrating a conventional transport solution and the transmit/receive path differential delay problems associated therewith.

Referring to FIG. 1, the transmit/receive path differential delay is determined by first ascertaining the roundtrip delay between Sysplex A 10 and Sysplex Z 12 along both a transmit path 14 and a receive path 16. Time stamp 1 18 is associated with a message (or frame) upon transmission from Sysplex A 10 to Sysplex Z 12. Time stamp 2 20 is associated with the message upon receipt at Sysplex Z 12. Time stamp 3 22 is associated with the message upon transmission from Sysplex Z 12 to Sysplex A 10. Finally, time stamp 4 24 is associated with the message upon receipt at Sysplex A 10. The roundtrip delay is equal to the difference between time stamp 4 24 and time stamp 1 18, and the transmit/receive path differential delay is always assumed to be equal to zero, meaning that the transmit and/or receive path delay (the one-way delay) is equal to the difference between time stamp 4 24 and time stamp 1 18 divided by two. Clock 2 20 is then reset by the one-way delay to sync with clock 1 18, or vice versa. As described below, however, this one-way delay is often inaccurate, as it is rarely, if ever, actually equal to one-half of the roundtrip delay.

The problems with the above systems and methods are that: 1) the fiber disposed between Sysplex A 10 and Sysplex Z 12 is likely spliced differently between the transmit path 14 and the receive path 16 and/or the length of the transmit path 14 differs significantly from the length of the receive path 16; 2) one or more amplifiers 26, such as one or more erbium-doped fiber amplifiers (EDFAs) and/or the like, and/or one or more dispersion compensation modules (DCMs) 28, the one or more DCMs likely differing significantly in fiber length, are disposed between Sysplex A 10 and Sysplex Z 12, the one or more amplifiers 26 and/or DCMs 28 selectively affecting the delay between the transmit path 14 and the receive path 16; and 3) multiplexing, such as wavelength-division multiplexing (WDM), dense wavelength-division multiplexing (DWDM), or the like, is likely incorporated between Sysplex A 10 and Sysplex Z 12 (thereby allowing a plurality of protocols to be bundled per wavelength, such as Enterprise System Connection (ESCON) protocol, Fiber Channel (FC) protocol, etc.), the multiplexing scheme incorporated selectively affecting the delay between the transmit path 14 and the receive path 16. Each of these interventions contributes significantly to the transmit/receive path differential delay.

It should be noted that 5 microseconds of differential delay is approximately equivalent to a difference in length between the transmit fiber path and the receive fiber path of 1 km. It should also be noted that the electronic equipment budget of 2.5 microseconds is equivalent to approximately 530 bytes of data at a 2.125 Gbps line rate, the rate at which an STP capable ISC link operates. In order to deal with clock noise and variations in clock frequencies as well as supporting signal multiplexing, the data streams generally need to be buffered, typically via first-in/first-out (FIFO) registers. Depths (sizes) of these FIFOs are typically in the range of hundreds of bytes, with several FIFOs being present in the end-to-end datapath all with different fill levels. The variation in fill levels between the sum of all FIFOs in the transmit path versus the sum of all FIFOs in the receive path must be maintained below approximately 530 bytes in order for the buffering function itself to avoid introducing differential delay that exceeds the 2.5 microsecond requirement. Control of FIFO depth and its variation becomes a critical component to reducing the differential delay in the electronics components of the system.

As a result of the above-described improperly determined and/or uncorrected for transmit/receive path differential delay, time stamps may be inaccurate and may, in some circumstances, be duplicative, resulting in transaction processing overlaps and, in general, inadequate performance of the GDPS integrated, automated application and data availability solution, among other problems. The systems and methods of the present invention simply and effectively address these problems.

BRIEF SUMMARY OF THE INVENTION

In various exemplary embodiments, the present invention provides systems and methods for geographically-diverse redundant servers and the like interconnected via wavelength division multiplexed (WDM) systems with managed path differential delay of the WDM systems. In an exemplary embodiment, the present invention provides transport systems and methods incorporating absolute time references, such as GPS time references and/or the like, and selective buildout delays, such as FIFO buildout delays and/or the like. As described above, in one exemplary embodiment, the transport systems and methods of the present invention are used in conjunction with the IBM GDPS integrated, automated application and data availability solution to meet and/or exceed the associated 10 microseconds transmit/receive path differential delay requirement. Other comparable uses are also contemplated herein, as will be obvious to those of ordinary skill in the art.

In an exemplary embodiment, a geographically diverse server system includes a first server; a second server; and an optical system interconnecting the first server and the second server over a transmit path and a receive path between the first server and the second server; wherein each of the first server and the second server is configured to: measure differential delay between the transmit path and the receive path; and compensate the differential delay between the transmit path and the receive path. The optical system may include a first network element connected to the first server and a second network element connected to the second server, and wherein the first network element is connected to the second network element through an optical network. The geographically diverse server system may further include a first external time reference connected to the first network element; and a second external time reference connected to the second network element. The first network element may be configured to calculate first transmit path delay and first receive path delay utilizing the first external time reference and wherein the second network element may be configured to calculate second transmit path delay and second receive path delay utilizing the second external time reference. The geographically diverse server system may further include a first buffer at the first network element configured to implement a delay based on the first transmit path delay and the first receive path delay; and a second buffer at the second network element configured to implement a delay based on the second transmit path delay and the second receive path delay. The geographically diverse server system may further include a first storage area network connected to the first server; and a second storage area network connected to the second server. The first server and the second server communicate one or more signals between one another via the optical system. The one or more signals may include Fibre Connection (FICON), Fibre Channel (FC), InterSystem Channel-3 (ISC-3) Compatibility Mode, InterSystem Channel-3 (ISC-3) Peer Mode, InterSystem Channel-3 (ISC-3) Peer Mode with Server Time Protocol messaging, and the like. The first server and the second server may form a Geographically-Dispersed Parallel Sysplex (GDPS) from IBM Corporation.

In another exemplary embodiment, a Geographically-Dispersed Parallel Sysplex (GDPS) system includes a first location (A); a second location (Z); and interconnecting means between the first location and the second location, wherein the interconnecting means includes a path differential measurement and management system. The path differential measurement and management system may be configured to: measure A to Z delay over the interconnecting means; measure Z to A delay over the interconnecting means; and compensate based on the measured A to Z delay and the measured Z to A delay.

In yet another exemplary embodiment, a method includes between two servers A and Z, measuring an A to Z delay and measuring a Z to A delay; and selectively compensating for delay based on the measured A to Z delay and the measured Z to A delay. The method may further include if measured A to Z delay<measured Z to A delay, implementing a delay between A and Z equal to measured Z to A delay minus measured A to Z delay; and if measure Z to A delay<measured A to Z delay, implementing a delay between Z and A equal to measured A to Z delay minus measured Z to A delay. The method may further include receiving an external time reference at both the servers A and Z; and utilizing the external time reference in the measuring steps.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides WDM systems and methods between geographically-diverse redundant servers managing path differential delay. In an exemplary embodiment, the present invention incorporates absolute time references, such as GPS time references and/or the like, and selective buildout delays, such as FIFO buildout delays and/or the like. As described above, in one exemplary embodiment, the transport systems and methods of the present invention are used in conjunction with the IBM GDPS integrated, automated application and data availability solution to meet and/or exceed the associated 10 microseconds transmit/receive path differential delay requirement. Other comparable uses are also contemplated herein, as will be obvious to those of ordinary skill in the art.

Figure 2:
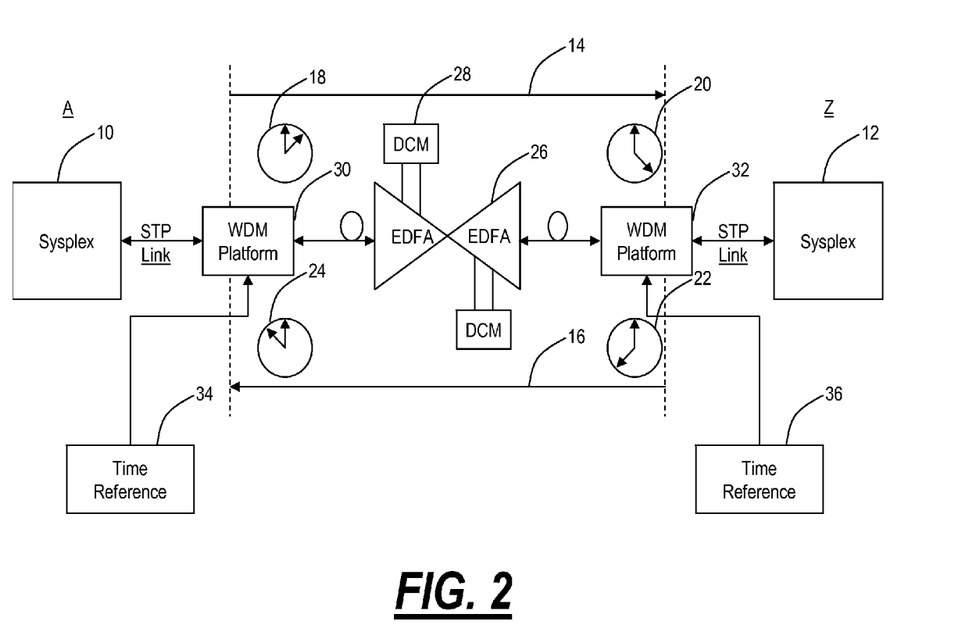
FIG. 2 is a schematic diagram illustrating the transport solution of the present invention, the transport solution incorporating absolute time references and selective buildout delays.

Referring to FIG. 2, Sysplex A 10 communicates with Sysplex Z 12 via a transmit path 14 and a receive path 16. Again, time stamp 1 18 is associated with a message (or frame) upon transmission from Sysplex A 10 to Sysplex Z 12. Time stamp 2 20 is associated with the message upon receipt at Sysplex Z 12. Time stamp 3 22 is associated with the message upon transmission from Sysplex Z 12 to Sysplex A 10. Finally, time stamp 4 24 is associated with the message upon receipt at Sysplex A 10. In the exemplary WDM case illustrated, these time stamps are provided by clock A 18,24 associated with WDM platform A 30 and clock Z 20,22 associated with WDM platform Z 32. As will be obvious to one of ordinary skill in the art, other suitable equipment may be substituted for the WDM platforms, and multiplexing does not have to be performed. The central idea is that a local clock is provided in proximity to each Sysplex. Clock A 18,24 is preferably in communication and synchronized with a first absolute time reference 34 and clock Z 20,22 is preferably in communication and synchronized with a second absolute time reference 36. Absolute time references A 34 and Z 36 are preferably GPS time references and/or the like, which are continually synchronized to a very high degree. For example, GPS time references are typically within 20 ns of one another. Thus, clock A 18,24 and clock Z 20,22 are continually synchronized to a very high degree.

Using the systems and methods of the present invention, the transmit/receive path differential delay is determined by first calculating the transmit path delay (A to Z delay, or AZd), which is equal to t2−t1. The receive path delay (Z to A delay, or ZAd), which is t4−t3, is then calculated. The transmit/receive path differential delay is simply the difference between AZd and ZAd, however AZd, ZAd, and this transmit/receive path differential delay cannot be accurately measured given the limitations of conventional systems and methods.

Once measured, the transmit/receive path differential delay is actually corrected for using the systems and methods of the present invention. If AZd<ZAd, then a ZAd−AZd buildout delay is selectively added in the A to Z direction via a FIFO buffer or the like. If AZd>ZAd, then a AZd−ZAd buildout delay is selectively added in the Z to A direction via a FIFO buffer or the like. Thus, selective buffering in one direction or the other (or both) is provided to account for and cancel out the measured transmit/receive path differential delay, thus ensuring that it never exceeds specified requirements. Buffer depth is used to compensate for transmit/receive path differential delay, alleviating the need for labor-intensive and expensive "physical" fixes. Such physical fixes are complicated by the fact that components cannot be fixed together, but must be addressed individually. The configuration of the exemplary WDM platforms 30,32 is illustrated in FIG. 3.

Figure 3:
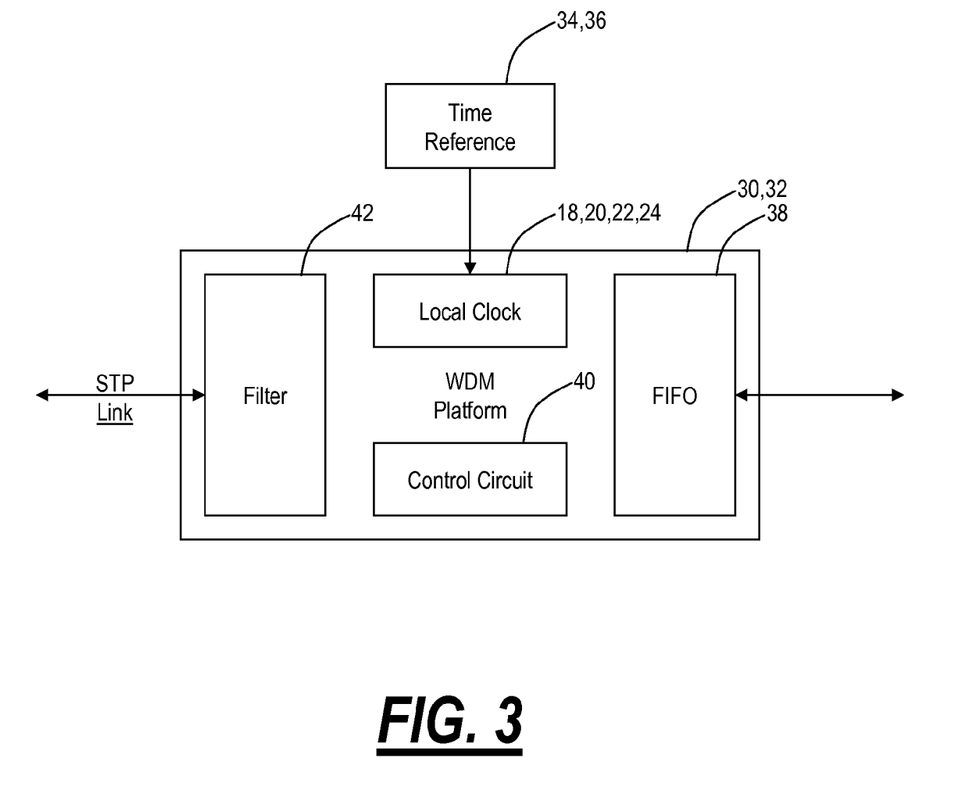
FIG. 3 is another schematic diagram illustrating the transport solution of the present invention.

Referring to FIG. 3, each WDM platform 30,32 includes a local clock 18,20,22,24 which is in communication with an absolute time reference 34,36, such as a GPS time reference and/or the like, and a FIFO buffer 38 and/or the like, as described above. In an exemplary embodiment, each WDM platform 30,32 includes an integrated GPS receiver with satellite acquisition and tracking capabilities through, for example, an external antenna. The GPS receiver is configured to provide the GPS time reference to the local clock 18,20, 22,24.

The Global Positioning System, usually called GPS, is the only fully-functional satellite navigation system. A constellation of more than two dozen GPS satellites broadcasts precise timing signals by radio, allowing any GPS receiver (abbreviated to GPSr) to accurately determine its location (longitude, latitude, and altitude) in any weather, day or night, anywhere on Earth. Many systems that must be accurately synchronized use GPS as a source of accurate time. For instance, the GPS can be used as a reference clock for time code generators or NTP clocks. Communications networks often rely on this precise timing to synchronize RF generating equipment, network equipment, and multiplexers.

In addition to positioning, the GPS provides a critical fourth dimension—time. Each GPS satellite contains multiple atomic clocks that contribute very precise time data to the GPS signals. GPS receivers decode these signals, effectively synchronizing each receiver to the atomic clocks. This enables users to determine the time to within 100 billionths of a second, without the cost of owning and operating atomic clocks.

Precise time is crucial to a variety of economic activities around the world. Communication systems, electrical power grids, and financial networks all rely on precision timing for synchronization and operational efficiency. The free availability of GPS time has enabled cost savings for companies that depend on precise time and has led to significant advances in capability.

In an another exemplary embodiment, the absolute time reference 34,36 may include a Building Integrated Timing Supply (BITS) clock. BITS clocks distribute precise frequency and time to equipment in central offices. The BITS hardware foundation is essential for the distribution of synchronization signals to support sync interfaces on central office transmission equipment including new Synchronous Ethernet platforms, as well as housing advanced server blades supporting carrier-class NTP and IEEE 1588 Precision Time Protocols. Of note, the BITS clock typically provides a timing reference signal at a particular stratum of accuracy. These clocks or timing references therefrom are typically deployed in central offices (COs), data centers, etc.

Each WDM platform 30,32 also includes a control circuit 40 operable for playing data out of the FIFO buffer 38 at a predetermined rate. This predetermined rate may be varied (preferably gradually) as the transmit/receive path differential delay measured varies with changing environmental conditions, etc. In other words, the systems and methods of the present invention are real time and dynamic, the fill level of the FIFO buffer 38 being variable. For example, the 16-byte FIFO buffer 38 may be selectively changed from 10 bytes to 9 bytes, and a byte must be backed out. At a minimum, the FIFO buffer 38 should be reset at each initialization/re-initialization. Each WDM platform further includes a filter 42 operable for averaging-out jitter and other short term delays (e.g. FIFO fill variation, optical path delay variation, etc.) that are preferably ignored.

In accordance with the systems and methods of the present invention, delay adjustment capability is dependent upon FIFO depth and delay adjustment resolution is dependent upon FIFO width (e.g. for a 10-bit wide FIFO, the resolution for an STP operating at 2.125 Gbps is approximately 4.7 ns.

Figure 4:
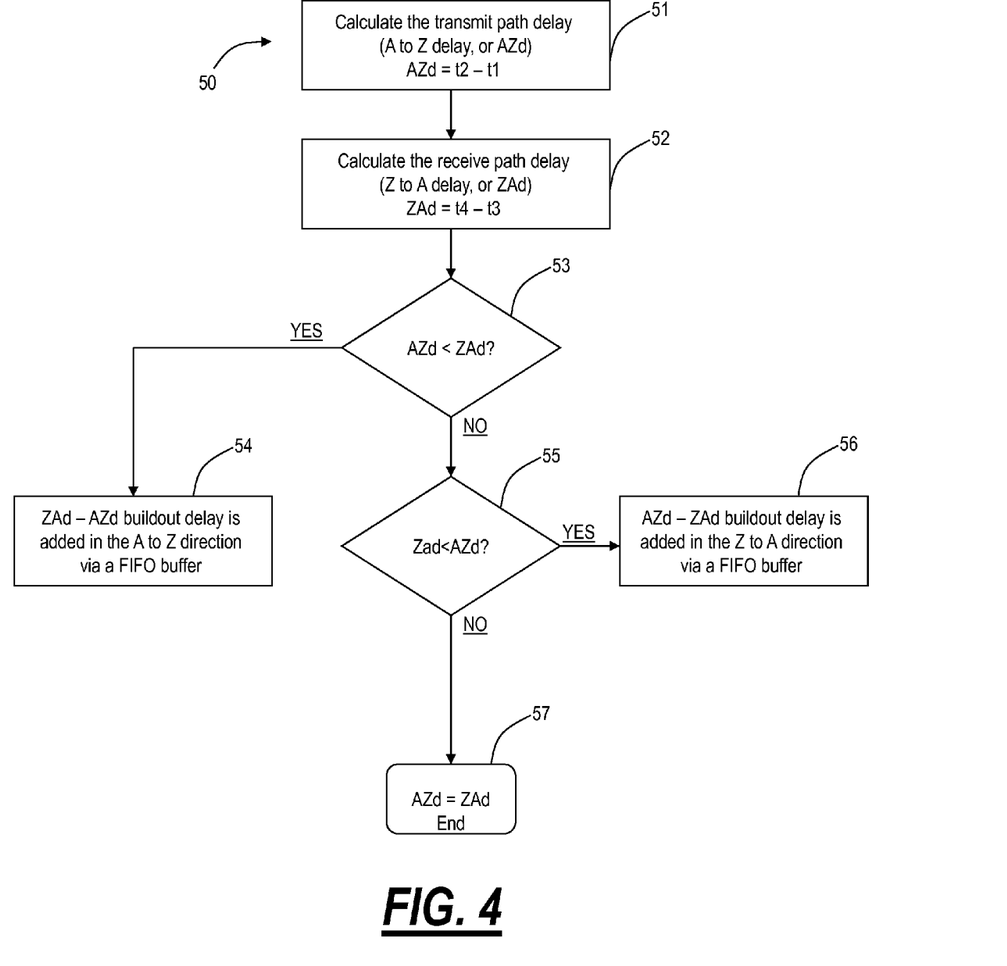
FIG. 4 is flowchart illustrating a method for measuring differential transmission path delays incorporating an absolute time reference, and providing a buildout delay to compensate for varying differential path delays due to, for example, optical transmission paths.

Referring to FIG. 4, an exemplary embodiment of the present invention includes a method 50 of measuring differential transmission path delays to an absolute time reference, and providing a buildout delay to compensate for varying differential path delays due to, for example, optical transmission paths. The method 50 can be used to calculate differential path delays between two locations A and Z which are geographically diverse, but which share the absolute time reference such as a GPS time reference and/or the like. The transmit path delay (A to Z delay, or AZd) is calculated based on t2−t1 (step 51), where t2 is a time stamp at the Z location referenced to the absolute time reference and t1 is a time stamp at the A location reference to the absolute time reference.

Additionally, the receive path delay (Z to A delay, or ZAd) is calculated based on t4−t3 (step 52), where t4 is a time stamp at the A location referenced to the absolute time reference and t3 is a time stamp at the Z location reference to the absolute time reference. If AZd is less than ZAd (step 53), then a buildout delay equal to ZAd−AZd is added in the A to Z transmission direction via a FIFO buffer (step 54). If ZAd is less than AZd (step 55), then a buildout delay equal to AZd−ZAd is added in the Z to A transmission direction via a FIFO buffer (step 56). Otherwise if AZd=ZAd, no buildout delay is added (step 57).

The method 50 can be utilized in any transmission system used to connect geographically diverse locations which require a certain differential delay to be met or exceeded. In an exemplary embodiment of the present invention, a densewave division multiplexing (DWDM) system such as, for example, the CIENA CN4200 available from CIENA Corporation of Linthicum, Md. is utilized to connect geographically diverse locations requiring a differential delay of a particular value or less. As discussed herein, optical transmission systems are particularly difficult to calculate differential path delays due to physical differences in the optical fibers. The systems and methods presented herein allow differential path delays to be calculated independent of the fiber characteristics utilizing absolute time references and provide for selective buildout delays to meet or exceed specific requirements.

Figure 5:
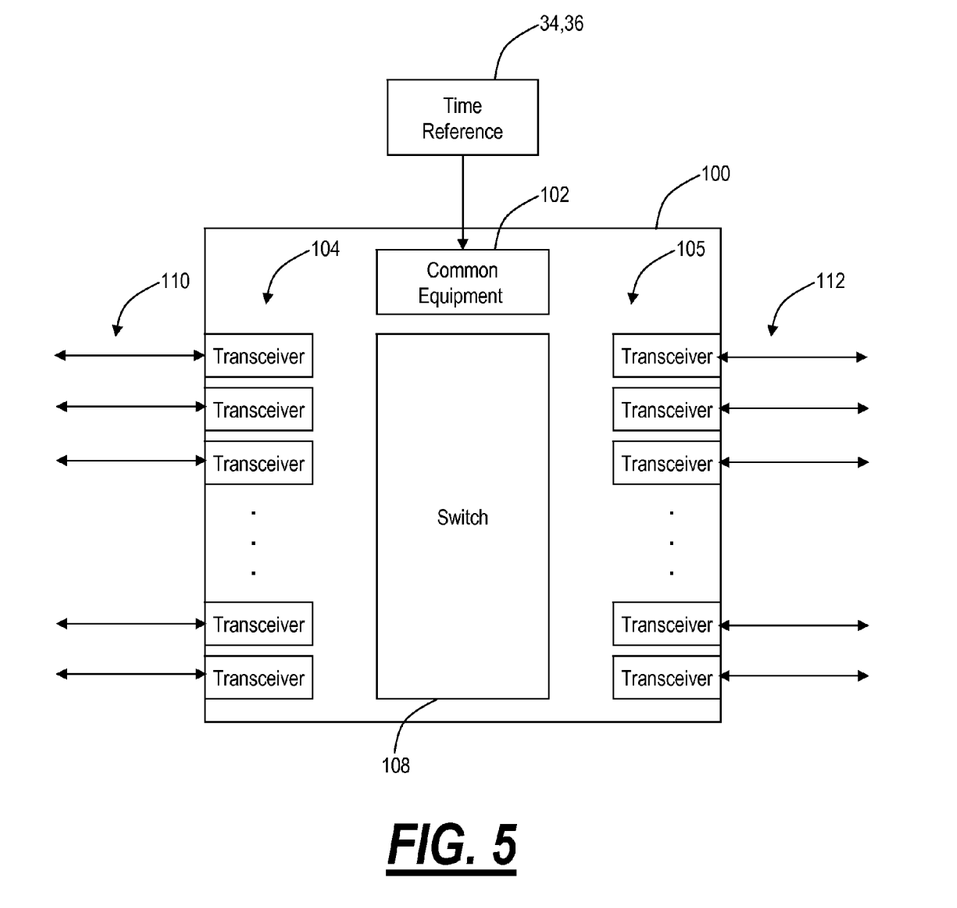
FIG. 5 is a schematic diagram of a WDM network element for an exemplary GDPS application of the present invention.

Referring to FIG. 5, in an exemplary embodiment, a WDM network element 100 is illustrated for an exemplary GDPS application. The WDM platforms 30,32 may be realized via the WDM network element 100. Those of ordinary skill in the art will recognize that GDPS is an exemplary application, and the present invention contemplates any type of server interconnection where path differential between transmit and receive of a WDM system must be minimized and managed. In general, the WDM network element 100 includes common equipment 102, ingress transceivers 104, egress transceivers 106, and a switch 108 interconnecting the transceivers 104, 106 therebetween. The common equipment 102 is generally configured to provide operations, administration, maintenance, and provisioning (OAM&P) functionality associated with the WDM network element 100. In an exemplary embodiment, the WDM network element 100 utilizes Optical Transport Network (OTN) and the OAM&P may include managing the OTN overhead on each of the transceivers 104,106. The common equipment 102 may include a plurality of interfaces such as, Ethernet connections, serial ports, timing ports, and the like. In an exemplary embodiment, the common equipment 102 is configured to receive the time references 34,36.

The ingress transceivers 104 and the egress transceivers 106 may physically be the same devices with the designation of ingress and egress a logical description of functionality. The transceivers 104,106 are configured to accept multiple protocols at multiple bit rates. For example, the transceivers 104,106 may accept any bit rate between 50 Mb/s and 11.7 Gb/s. Furthermore, the transceivers 104,106 may include multiplexing functionality and the like to consolidate lower bit rate signals into a single, higher bit rate signal. In one exemplary embodiment, the transceivers 104,106 are configured to encapsulate client and line signals into OTN to provide full transparency while preserving OAM&P functionality at the WDM layer. The multiple protocols may include any of Enterprise Systems Connection (ESCON), IBM Sysplex Timer (ETR/CLO), Fibre Connection (FICON) (at 1 Gb/s, 2 Gb/s, 4 Gb/s, etc.), Fibre Channel (e.g., FC100 at 1 Gb/s, FC200 at 2 Gb/s, FC400 at 4 Gb/s, etc.), Fibre Channel InterSwitch Links (ISL) (up to 10 Gbps), InterSystem Channel-3 (ISC-3) Compatibility Mode (1 Gbps), InterSystem Channel-3 (ISC-3) Peer Mode (2 Gbps), InterSystem Channel-3 (ISC-3) Peer Mode (1 Gbps) through RPQ 8P2197, Server Time Protocol (ISC-3 Peer Mode with STP messaging), Ethernet (e.g., 100 BaseX, Gigabit Ethernet (GE), LOGE, etc.), and the like.

The switch 108 is configured to provide an interface between the ingress transceivers 104 and the egress transceivers 106. This interface may include merely providing client signals 110 from the ingress transceivers 104 to the egress transceivers 106 which provides line signals 112 to external equipment, fibers, etc. (e.g. to a WDM multiplexer/demultiplexer or the like). Alternatively, the switch 108 may be configured to provide time division multiplexed (TDM) functionality such as multiplexing client signals, switching such as OTN switching, and the like. In an exemplary embodiment, the switch 108 is realized on the transceivers 104,106. In another exemplary embodiment, the switch 108 is realized as a physically separate device from the transceivers 104,106.

Collectively, the common equipment 102, the transceivers 104,106, and the switch 108 are configured to perform the systems and methods described herein. In particular, the common equipment 102, the transceivers 104,106, and the switch 108 may be configured to perform the method 50 of measuring differential transmission path delays to an absolute time reference, and providing a buildout delay to compensate for varying differential path delays due to, for example, optical transmission paths. Those of ordinary skill in the art will recognize the common equipment 102, the transceivers 104, 106, and the switch 108 may include hardware, software, firmware, etc. to receive the time references 34,36 and provide the appropriate buildout as required. The FIFOs 38 may be incorporated in the transceivers 104,106 and/or the switch 108.

In an exemplary embodiment, the ingress transceivers 104 and the egress transceivers 106 are configured with CLO signals, ETR signals, ISC signals, and ISL signals. For example, the CLO signals and the ETR signals may be 8 Mb/s each and multiplexed to a higher bit rate via the ingress transceivers 104 or some other equipment. In another exemplary embodiment, the ingress transceivers 104 and the egress transceivers 106 are configured with ISC-3 peer signals and ISL signals therebetween.

Figure 6:
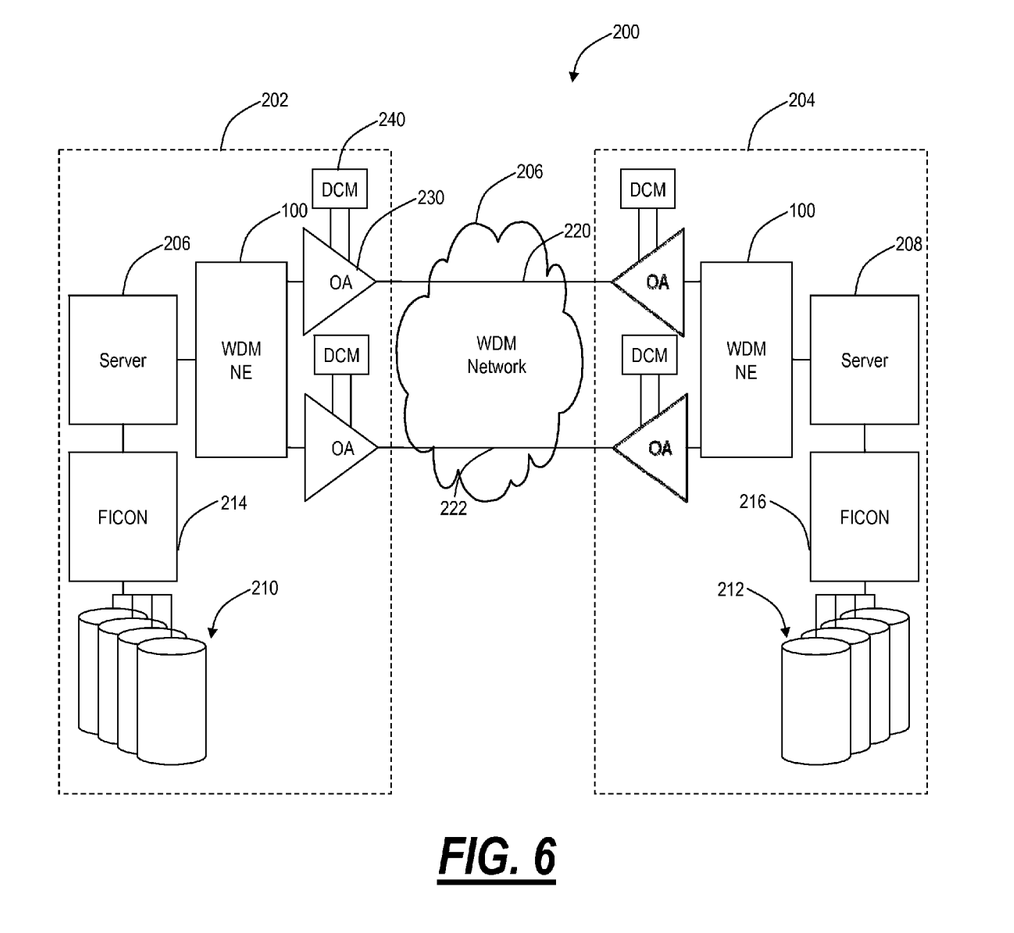
FIG. 6 is a schematic diagram of a redundant server system with geographical diversity and interconnection via the WDM network elements of FIG. 5.

Referring to FIG. 6, in an exemplary embodiment, a redundant server system 200 is illustrated with geographical diversity and interconnection via the WDM network elements 100. The redundant server system 200 includes two physically diverse locations 202,204 interconnected via a WDM network 206. Those of ordinary skill in the art will recognize the WDM network 206 may include any combination of optical amplifiers, regenerators, dispersion compensation modules, optical add/drop multiplexers (OADMs), reconfigurable OADMs, and the like. The redundant server system 200 may include servers 206,208 used for a variety of applications. In an exemplary embodiment, the servers 206,208 may be connected to data stores 210,212 via FICON 214,216 devices or some other storage area network (SAN) configuration.

As those of ordinary skill in the art will appreciate, various applications associated with the redundant server system 200 may require precise synchronization between the locations 202,204. Exemplary applications may include real-time data applications (e.g., financial transactions, inventory applications, mirrored data storage, and the like). Furthermore, it is often desired to have physically diversity between the locations 202,204 to provide adequate redundancy. As such, the WDM network 206 and the WDM network elements 100 at the locations 202,204 enable physically diversity while simultaneously managing the path differential delay.

Specifically, the WDM network elements 100 each include two connections 220,222 through the WDM network 206. The connection 220 may be from the location 202 to the location 204 and the connection 222 may be from the location 204 to the location 202. That is, the connections 220,222 form a bi-directional optical link connecting the servers 206,208 through the WDM network elements 100. Various techniques may be utilized to maintain the precise synchronization between the locations 202,204 such as, but not limited to, forming the connections 220,222 to traverse the same paths in the WDM network 206, utilizing common WDM devices (e.g., DCMs) in the WDM network 206, and the like. However, since optical transmission in the WDM network 206 is ultimately analog due to the nature of light, there may still be offsets between the locations 202,204. For example, the locations 202,204 and the WDM network 206 may include various analog components such as optical amplifiers (OAs) 230, DCMs 240, and the like. Different OAs 230 and DCMs 240 with identical specifications may include delay differences. For example, two different DCMs 240 may each be characterized to provide dispersion compensation over the same distance (e.g., 80 km), but due to fiber length differences, doping differences, etc. have slightly different transit times. Furthermore, these delays, while extremely small (e.g., in microseconds), may affect operation of the servers 206,208.

As such, redundant server system 200 is configured to provide the method 50 of measuring differential transmission path delays to an absolute time reference, and providing a buildout delay to compensate for varying differential path delays due to, for example, optical transmission paths. Specifically, the WDM network elements 100 are configured to implement the method 50 between the connections 220,222 thereby measuring and managing path differential associated therewith.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A geographically diverse server system, comprising:
a first server;
a second server;
an optical system interconnecting the first server and the second server over a transmit path and a receive path between the first server and the second server;
wherein each of the first server and the second server is configured to:
measure differential delay between the transmit path and the receive path; and
compensate the differential delay between the transmit path and the receive path;
wherein the optical system comprises a first network element connected to the first server and a second network element connected to the second server, and wherein the first network element is connected to the second network element through an optical network;
a first external time reference connected to the first network element; and
a second external time reference connected to the second network element;
wherein the first network element is configured to calculate first transmit path delay and first receive path delay utilizing the first external time reference and wherein the second network element is configured to calculate second transmit path delay and second receive path delay utilizing the second external time reference.

2. The geographically diverse server system of claim 1, further comprising:
- a first buffer at the first network element configured to implement a delay based on the first transmit path delay and the first receive path delay by buffering; and
- a second buffer at the second network element configured to implement a delay based on the second transmit path delay and the second receive path delay by buffering.

3. The geographically diverse server system of claim 1, further comprising:
- a first storage area network connected to the first server; and
- a second storage area network connected to the second server.

4. The geographically diverse server system of claim 1, wherein the first server and the second server communicate one or more signals between one another via the optical system.

5. The geographically diverse server system of claim 4, wherein the one or more signals comprise Fibre Connection (FICON).

6. The geographically diverse server system of claim 4, wherein the one or more signals comprise Fibre Channel (FC).

7. The geographically diverse server system of claim 4, wherein the one or more signals comprise InterSystem Channel-3 (ISC-3) Compatibility Mode.

8. The geographically diverse server system of claim 4, wherein the one or more signals comprise InterSystem Channel-3 (ISC-3) Peer Mode.

9. The geographically diverse server system of claim 4, wherein the one or more signals comprise InterSystem Channel-3 (ISC-3) Peer Mode with Server Time Protocol messaging.

10. The geographically diverse server system of claim 1, wherein the first server and the second server form a Geographically-Dispersed Parallel Sysplex (GDPS) from IBM Corporation.

11. A Geographically-Dispersed Parallel Sysplex (GDPS) system, comprising:
- a first location (A);
- a second location (Z); and
- interconnecting means between the first location and the second location, wherein the interconnecting means comprises a path differential measurement and management tool;
- wherein the path differential measurement and management tool is configured to:
  - measure A to Z delay over the interconnecting means;
  - measure Z to A delay over the interconnecting means;
  - if measured A to Z delay<measured Z to A delay, implement a delay between A and Z equal to measured Z to A delay minus measured A to Z delay; and
  - if measured Z to A delay<measured A to Z delay, implement a delay between Z and A equal to measured A to Z delay minus measured Z to A delay.

12. A method, comprising:
- between two servers A and Z, measuring an A to Z delay and measuring a Z to A delay at the two servers A and Z;
- selectively compensating for delay based on the measured A to Z delay and the measured Z to A delay at the two servers A and Z;
- if measured A to Z delay<measured Z to A delay, implementing a delay between A and Z equal to measured Z to A delay minus measured A to Z delay; and
- if measured Z to A delay<measured A to Z delay, implementing a delay between Z and A equal to measured A to Z delay minus measured Z to A delay.

13. The method of claim 12, further comprising:
- receiving an external time reference at both the servers A and Z; and
- utilizing the external time reference in the measuring the A to Z delay and measuring the Z to A delay.

* * * * *